May 8, 1956 A. C. BERNSTEIN 2,744,966

INTERCOMMUNICATION SYSTEM

Filed Oct. 5, 1950 7 Sheets-Sheet 1

INVENTOR.
ALLAN C. BERNSTEIN

BY

Ostrolenk & Faber

ATTORNEYS

May 8, 1956 A. C. BERNSTEIN 2,744,966

INTERCOMMUNICATION SYSTEM

Filed Oct. 5, 1950 7 Sheets-Sheet 2

INVENTOR.
ALLAN C. BERNSTEIN

BY
Ostrolenk & Faber
ATTORNEYS

May 8, 1956 A. C. BERNSTEIN 2,744,966

INTERCOMMUNICATION SYSTEM

Filed Oct. 5, 1950 7 Sheets-Sheet 3

INVENTOR.
ALLAN C. BERNSTEIN

BY

Ostrolenk & Faber

ATTORNEYS

May 8, 1956 A. C. BERNSTEIN 2,744,966

INTERCOMMUNICATION SYSTEM

Filed Oct. 5, 1950 7 Sheets-Sheet 4

INVENTOR.
ALLAN C. BERNSTEIN

BY

Ostrolenk & Faber

ATTORNEYS

INTERCOMMUNICATION SYSTEM

Filed Oct. 5, 1950

INVENTOR.
ALLAN C. BERNSTEIN
BY
Ostrolenk & Faber
ATTORNEYS

INTERCOMMUNICATION SYSTEM

Filed Oct. 5, 1950 7 Sheets-Sheet 6

INVENTOR.
ALLAN C. BERNSTEIN
BY
Ostrolenk & Faber
ATTORNEYS

May 8, 1956 A. C. BERNSTEIN 2,744,966

INTERCOMMUNICATION SYSTEM

Filed Oct. 5, 1950 7 Sheets-Sheet 7

INVENTOR.
ALLAN C. BERNSTEIN

BY

Ostrolenk & Faber

ATTORNEYS

United States Patent Office 2,744,966
Patented May 8, 1956

2,744,966

INTERCOMMUNICATION SYSTEM

Allan C. Bernstein, Great Neck, N. Y., assignor to Executone Inc., New York, N. Y., a corporation of New York Application October 5, 1950, Serial No. 188,563

15 Claims. (Cl. 179—39)

My invention relates to intercommunication systems and more particularly to such systems designed to protect the privacy of a user.

Heretofore intercommunication systems have used circuit arrangements by which a call was originated by a voice. The called party accepted and completed the call by performing some manual operation such as throwing a switch corresponding to the calling station. The operation of a switch or the lifting of a phone completed the circuit and permitted two-way conversation.

However, until the switch was operated, no communication circuit was completed from the called party's station to the calling party's station. In this manner, conversation in the vicinity of the user's station was assured privacy. That is to say, eavesdropping by any calling party to another party station was prevented and fully under control of the called party.

This system, however, was found disadvantageous since it required an operation by a user before he could make or complete a call. In many instances, he was not in a convenient position for operating a switch.

To this end, a system has been developed by which a calling party can immediately complete a two-way communication circuit at his station. In such a system, the calling party upon completing a two-way communication, calls a called party who is then aware that he is in communication connection with the calling party and without any further operation proceeds to carry on communication with the calling party.

This, however, has been found to have removed the advantage of privacy referred to above since with such a system it becomes possible for a calling party to complete the electrical circuit and without starting conversation eavesdrop on the convention in the vicinity of the called station. Since the called station depends upon a call in order to know that a communication has been completed, he would be unaware of this eavesdropping.

In general, intercommunication systems operated in one of two fashions. The called party had the convenience of replying without performing any manual operations, but he had no guarantee against eavesdropping, or the user of the called station was assured of privacy against eavesdropping but he had to perform a manual operation at both the start and finish of a conversation.

The various types of intercommunication systems which existed in the prior art are as follows:

(1) A system in which the called party at a remote station had a line that was always open to the calling party. No operations were necessary on the part of the called party to reply and there was no privacy. In this system, between calls, background noise in the vicinity of the staff station was overheard at the master station. The staff station originated calls to the master either by talking loudly or by talking very closely into the staff station.

(2) Same as (1) except that the line between the staff station and the master station was not normally complete between conversations. To originate a conversation, a manual operation was performed by the station desiring to originate the call. Once the call was originated, no manual operations were required at the staff station. This system also provided no privacy at the staff station except in one modification wherein a switch had to be operated at the staff station at the commencement of the conversation and again at the termination of the conversation.

(3) Arrangements which permitted a staff station to indicate the desire to initiate a conversation by means of an annunciator signal. Conversation was then initiated by manual means at the master station. The staff station, however, had no privacy or again operated a switch at both the beginning and end of the conversation.

(4) Arrangements by which a switch was operated by the station at both ends of the conversation each time the user of the station wished to speak. Such switches were usually of a spring return type. Thus, privacy was assured.

(5) Arrangements by which the originating station selected one of several buttons leading to different stations, operated that button, and then conversed using a talk switch. The user of the called station selected a button corresponding to that of the calling station and operated this button before replying. It was not necessary to manipulate controls after that at the called station in some versions and privacy was assured, but again a manual operation had to be performed at the called station prior to the conversation. In a variation of this system, annunciator signals were included for ease of operation or for easier location of the correct button to operate.

(6) In most of the above systems, the operation of a talk key could be dispensed with if it were necessary to lift a phone from a hook or cradle to complete the circuit and privacy could still be maintained. The lifting of the telephone constituted a manual operation prior to conversation.

The basic drawback in these six systems has been that if you wished privacy in the vicinity of the station it was necessary to perform a manual operation at the start and end of a conversation; if you wished the convenience of replying to an incoming call without performing any manual operation, you could obtain it only at the sacrifice of privacy.

The object of my invention is to develop a system wherein the user of a station can have both the convenience of replying without performing any manual operations and freedom from eavesdropping.

In accordance with my invention I have provided circuit arrangements whereby the act performed by the calling party for completing the two-way communication circuit also automatically and simultaneously operates signalling devices at the called station to immediately apprise the called party that his communication line has been completed and that conversation in the vicinity of his station is, therefore, being carried over the system.

Accordingly, an object of my invention is to provide a novel circuit for enabling automatic two-way communication without any operation on the part of the called party, combined with novel circuit means for automatically signalling the called party in response to the completion of such a circuit.

A further object of my invention is to provide a novel circuit arrangement in an intercommunication system in which the steps of completing a call automatically completes the operation of a signal device.

A further object of my invention is to provide a novel intercommunication system utilizing a minimum number of and simplified circuits extending between stations of the intercommunication system.

In the operation of signalling devices for the system described above, it is desirable that the called party's attention be attracted both by a visual and audible means so that in the event one of these does not attract his attention, the other will.

An audible signal is normally the most attention-getting type if the user of a unit is present at the time the signal is originated. The visual signal is most useful if the user happens to be away from the unit at the time the circuits are completed and acts as a notification that circuits have been completed when he returns to the vicinity of the unit.

Usually where a visual signal such as a lamp is used, the voltage drop across the audible indicator and that across the visual indicator are such that they are preferably connected in parallel across the system. Such a parallel circuit, however, is an extra current consumer, and, therefore, would substantially increase the load on the line.

When both a visual and audible signalling system are energized simultaneously, it is normally necessary to provide energy sufficient to operate both devices and if the circuit means for operating the signalling circuits are kept connected throughout the conversation, the energy needed to operate both devices must be supplied continuously for the duration of the conversation. As a means of decreasing such energy and lightening the load on the power supply furnishing this energy, I have discovered a circuit arrangement and construction of both the audible and visual signal device which enables the connection of these two in series in a manner to ensure full operation of both indicators with a minimum power consumption.

In this manner it is possible to supply a major portion of a fixed voltage to the audible signalling device first and at a later time after the audible signalling device has received sufficient energy to perform its function to decrease the amount of energy supplied to the audible signalling device and to then supply the bulk of the said fixed voltage to the visual signalling device. The audible signalling device to be practical must be a device which provides an audible signal for a limited time only, such as a single stroke chime, to prevent interference with the subsequent conversation and the above remarks apply particularly to audible signalling devices of limited duration.

Accordingly, a further object of my invention is to provide a signalling circuit for the intercommunication system described above.

A still further object of my invention is to provide a novel arrangement of a visual indicator and an audible indicator in an intercommunication system as described above.

A still further object of my invention is to provide a novel arrangement of visual and audible indicators in an intercommunication system.

Another object of my invention is to provide a visual and audible signalling circuit with a minimum power consumption.

In intercommunication systems where more than one conversation at a time could theoretically take place, or where any station on the system might call another station already engaged in conversation, it is desirable to provide means for preventing such interference with the conversation and also to notify the operator of a station that he has attempted to contact a station already busy.

Accordingly, an object of my invention is to accomplish this function by circuit arrangements which are relatively simple, inexpensive and foolproof in operation.

Another object of my invention is a busy signal in an intercommunication system to notify a calling station that it has attempted to contact a station already busy.

Still another object of my invention is the inclusion of a privacy switch to permit the user of a station to achieve privacy before or after being notified of circuit completion by audible and visual means and without the necessity of replying to the incoming call, particularly in situations where the called party desires to continue a particular conversation without interruption by the incoming call.

A still further object of my invention is a novel improved intercommunication system whereby any station in the system can talk to any other station in the system and two or more simultaneous conversations between individual pairs or combinations of stations can take place.

Still another object of my invention is a pulse circuit to blank out the amplifier during the switching cycle.

These and other objects of my invention will become apparent from the description taken in connection with the following figures.

Figure 4:
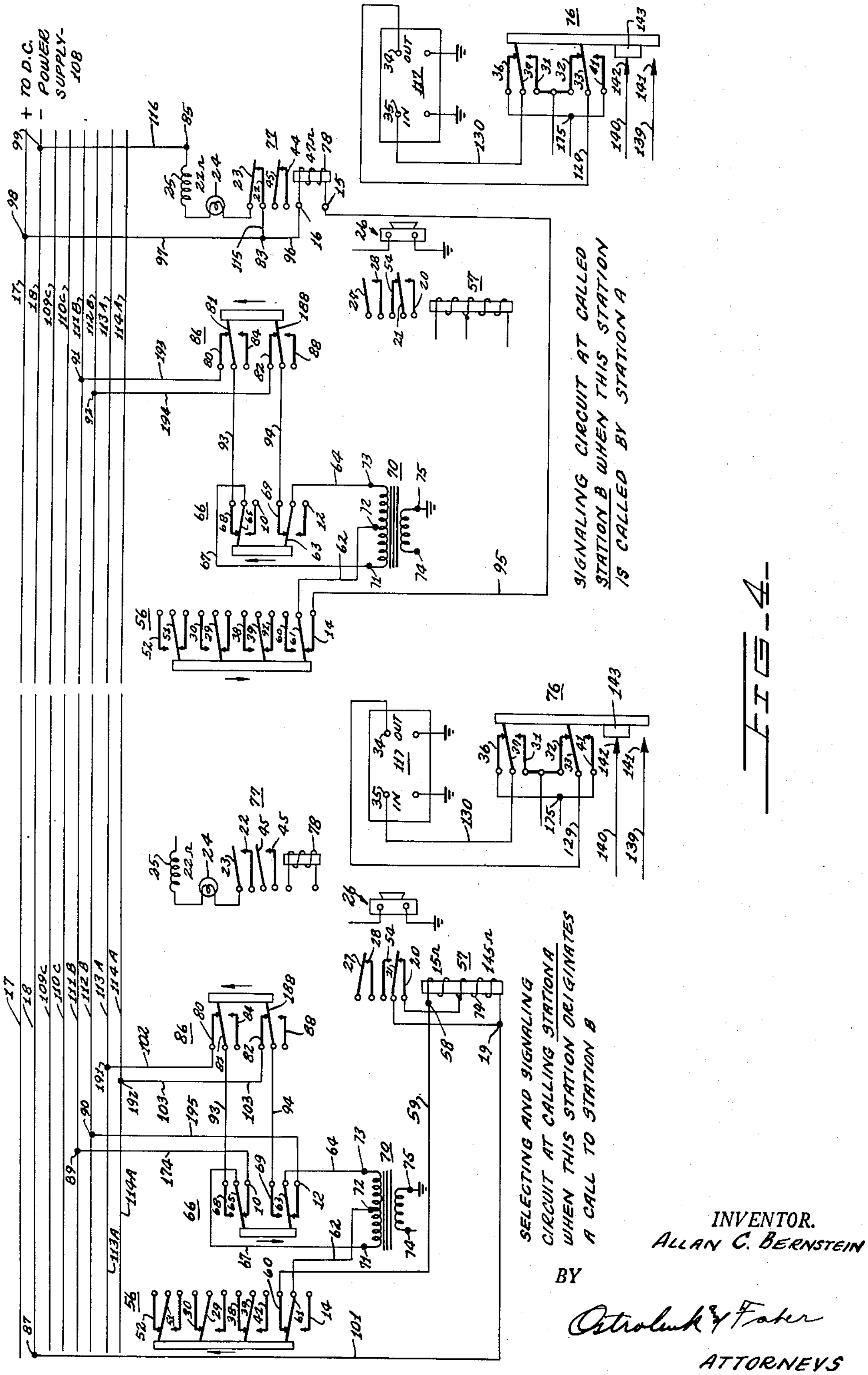

Figure 4 left is a partial wiring diagram of station A showing the selecting and signalling circuit used when station A originates a call to station B and on the right includes a partial wiring diagram of station B showing the signalling circuit used when station A originates a call to station B.

Figure 5:
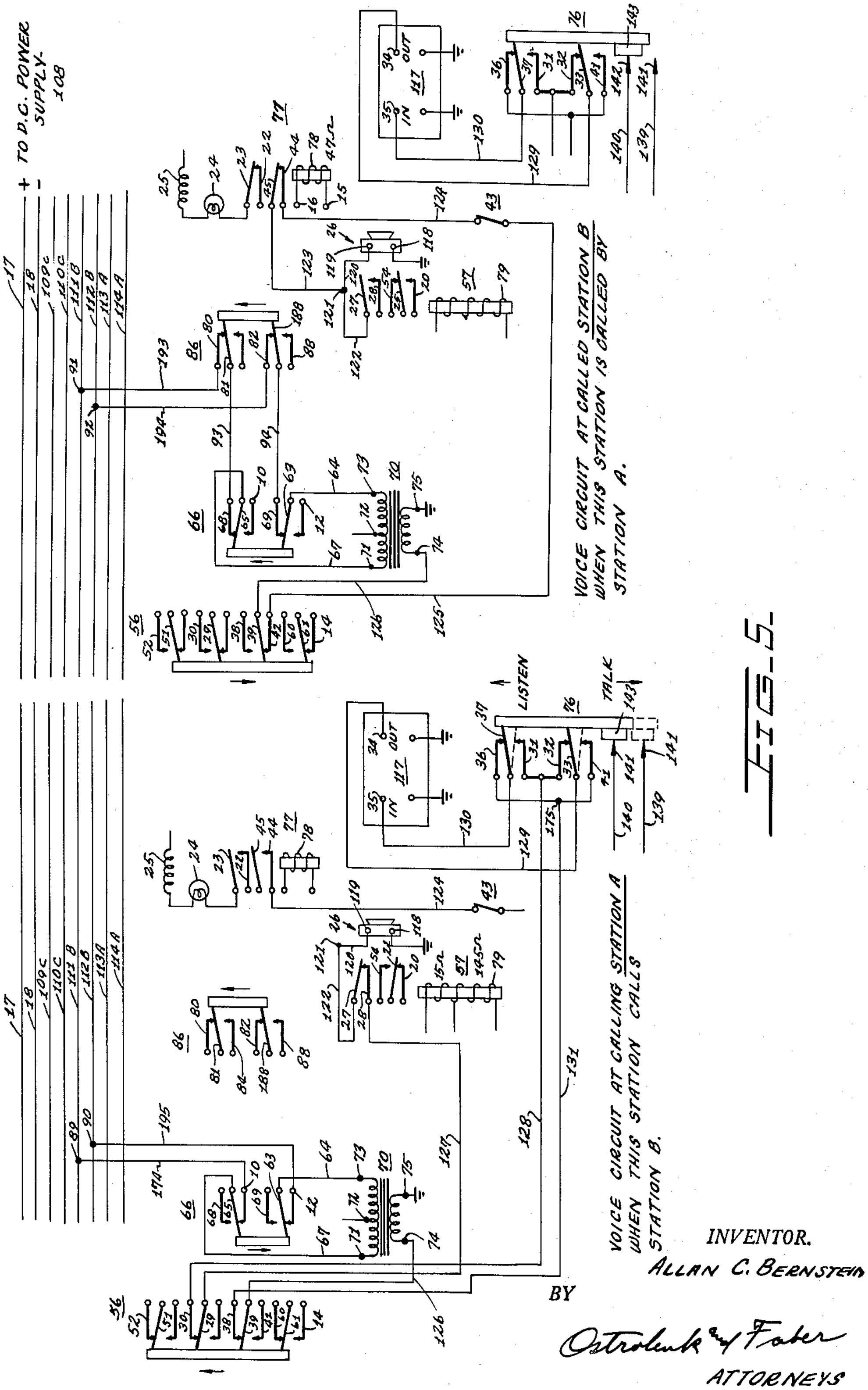

Figure 5 left is a partial wiring diagram of station A similar to Figure 4 showing the voice circuit used when station A originates a call to station B and on the right includes a partial wiring diagram of station B similar to Figure 5 showing the voice circuit used when station A originates a call to station B.

Figure 6:
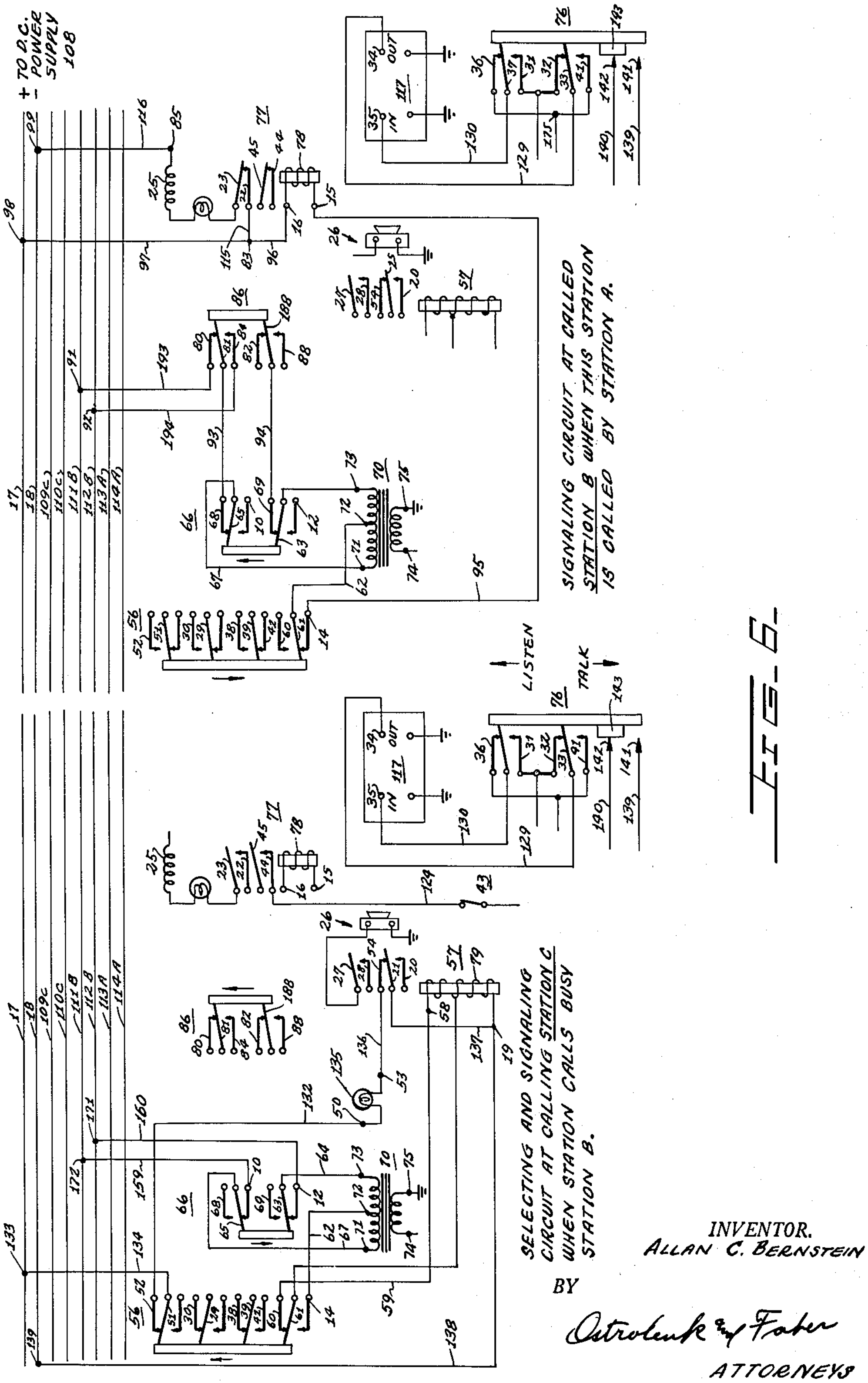

Figure 6 left is a partial wiring diagram of station C showing the busy signal circuit when station C attempts to call station B after station A has originated a call to station B and on the right is a partial wiring diagram of station B after station A has originated a call to station B.

Figure 7:
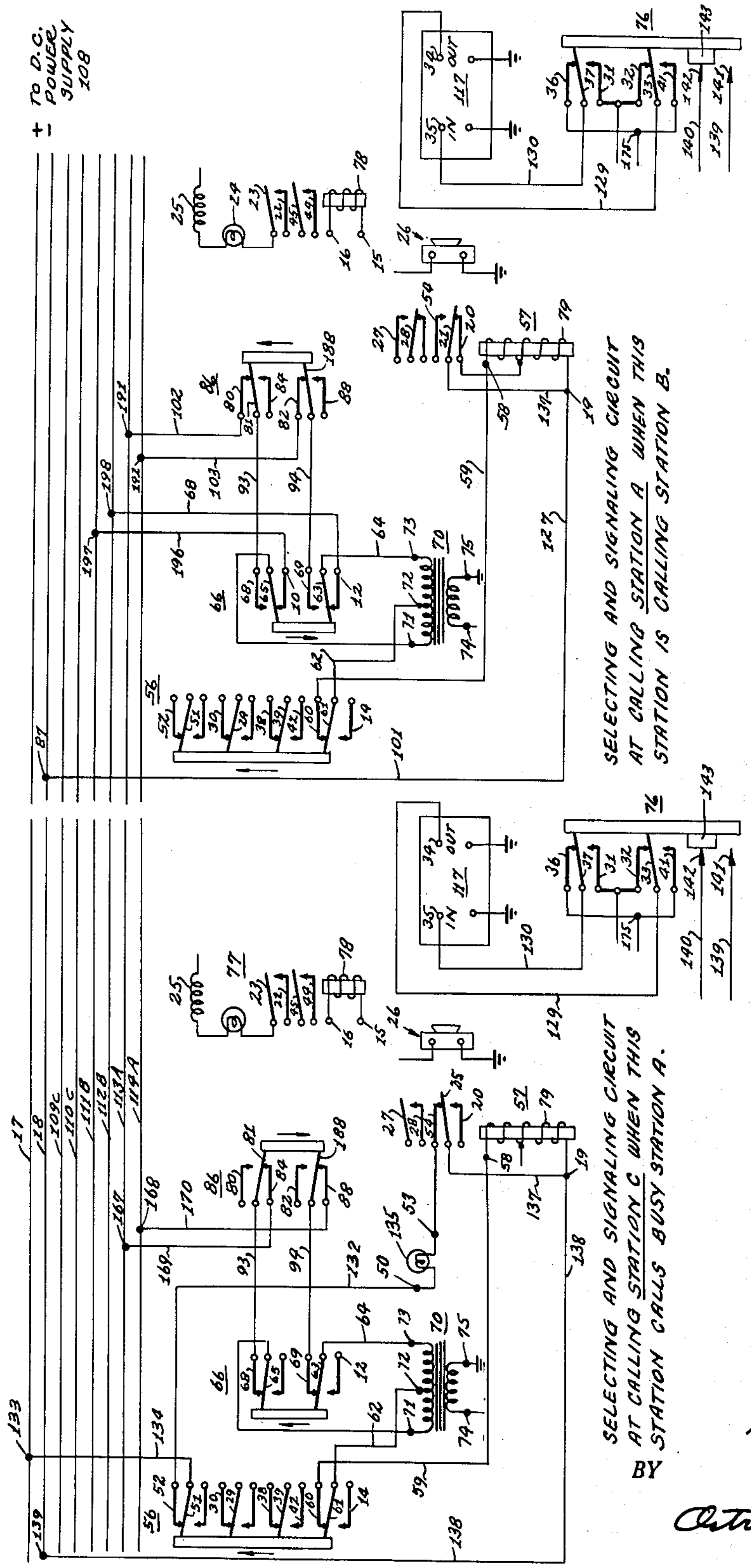

Figure 7 left is a partial wiring diagram of station C showing the busy signal circuit when station C attempts to call station A after station A has originated a call to station B and on the right is a partial wiring diagram of station A after this station has originated a call to station B.

A. INTRODUCTION TO CIRCUITS

(1) *Stations and their interconnections*

Figure 1:
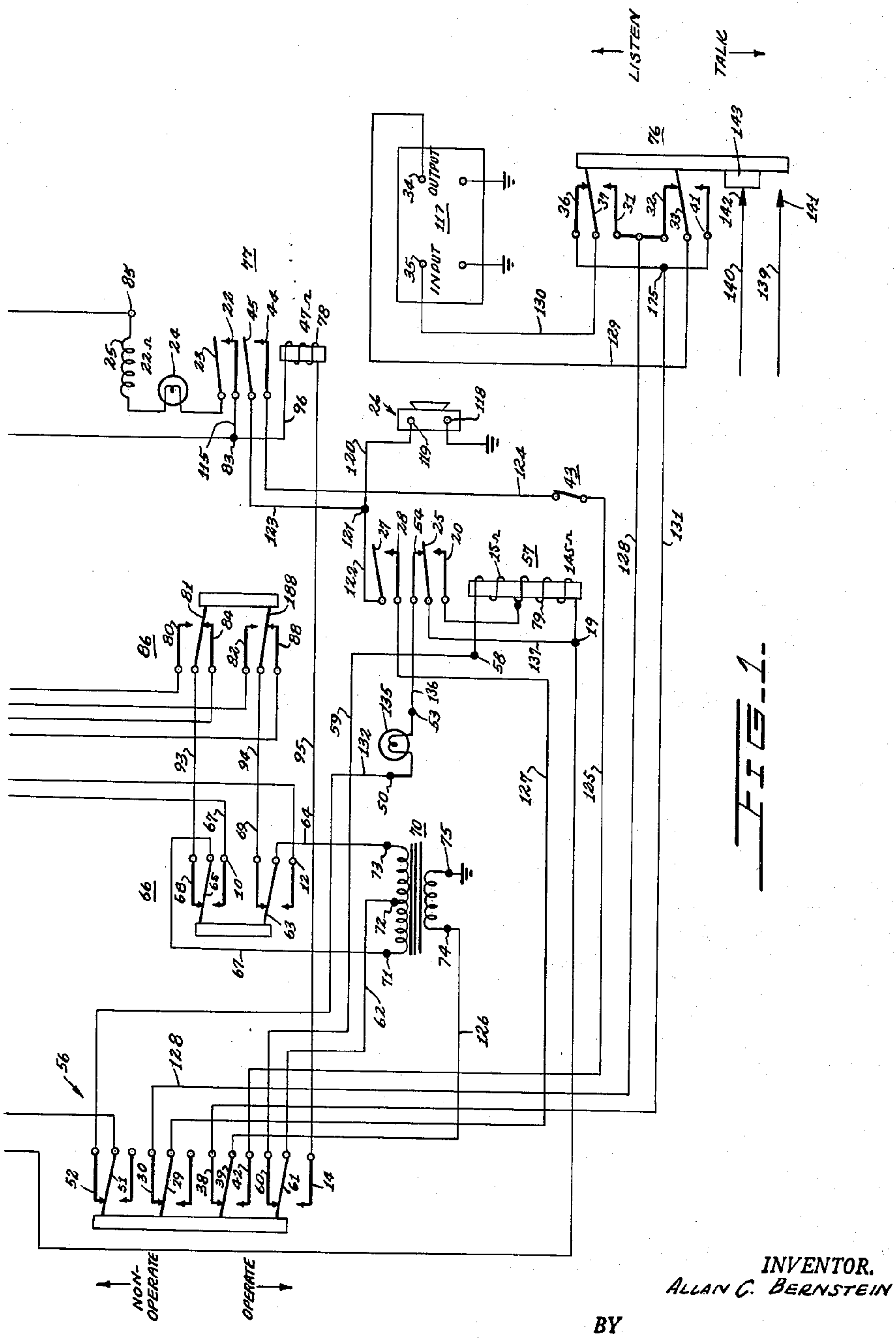
Figure 1 is a partial circuit diagram of any one of the many stations of an intercommunication system of my invention.
Figure 2:
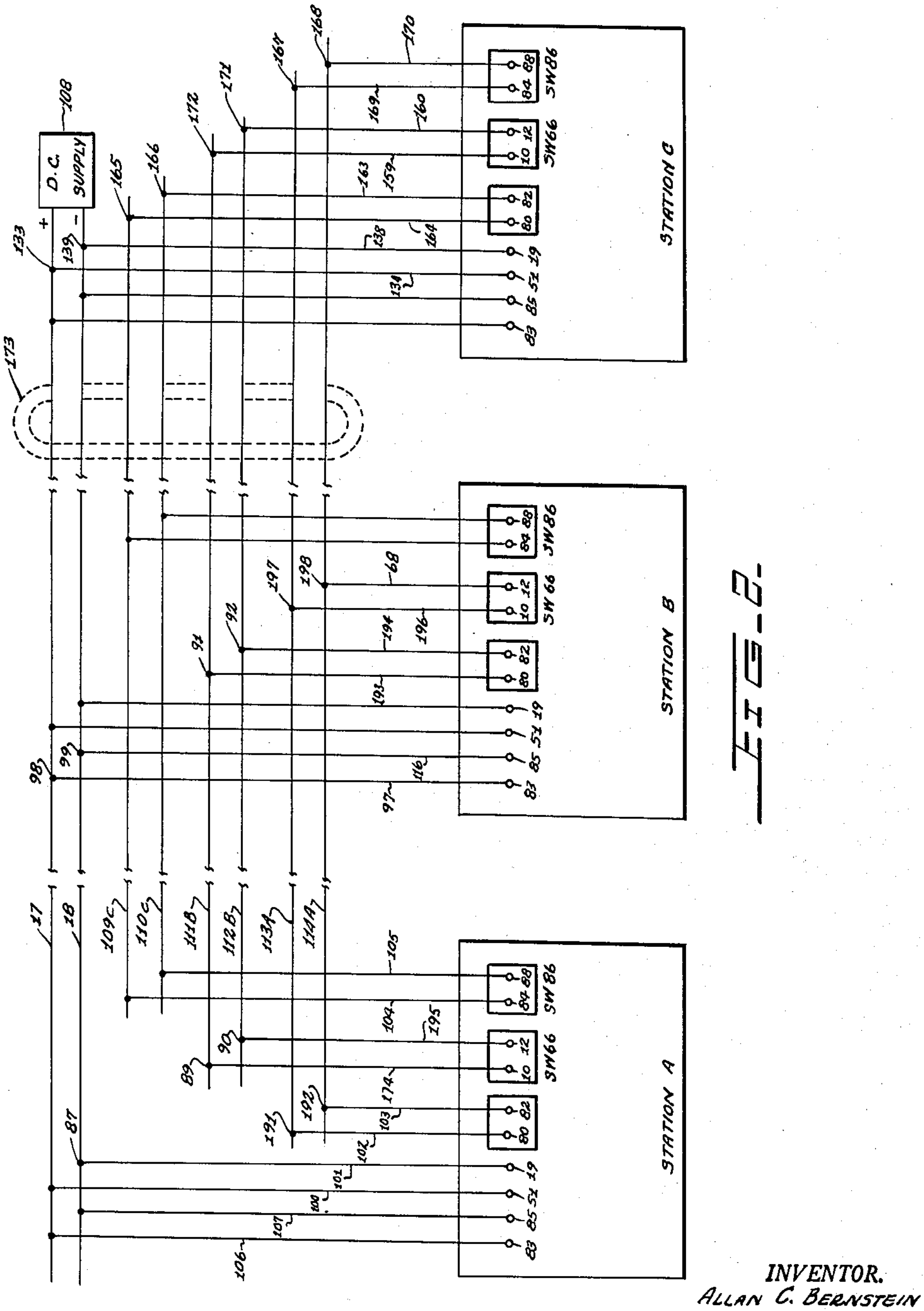
Figure 2 is a circuit diagram of the electrical connections of three stations to the four pair cable in the intercommunication system of my invention.

The various stations of my intercommunication system are all of identical construction and wiring, and Figure 1 illustrates schematically any one of these many stations. For the purpose of simplicity, I will describe the operation of my novel intercommunication system with a network comprising only three stations although it will hereinafter become apparent that any number of stations may be incorporated in the network. Figure 2 illustrates how the three stations A, B and C are connected to the multipair cable 173 which contains four pairs of wires 17—18, 109*c*—110*c*, 111*b*—112*b* and 113*a*—114*a*.

The battery pair of wires 17 and 18 supplies to the entire system a source of voltage from the 6 volt direct current supply 108. The pair of wires 109*c* and 110*c* carry the signal and voice current between station C and the station originating a call (i. e. station A or B) to station C. The pair of wires 111*b* and 112*b* act in a similar manner to carry the signal and voice current between station B and the station originating the call to station B (i. e. station A or C). The number of pairs of wires in the cable 173 will exceed the number of stations in the network by one pair. That is, the cable will contain a signal-voice pair for each station plus one battery pair 17—18 common to all stations.

The parts contained in each station unit, as may be seen in Fig. 1, include five manually operated switches, two electrically operated relays, an amplifier and a speaker microphone unit.

(2) *Switches*

The standby switch 56 and the station selector switches 66 and 86 have movable contacts that can be placed in either the non-operate or operate position. The former is the up position to engage the stationary contacts shown with arrows pointing down, and the latter the down position to engage the stationary contacts shown with the arrows pointing up.

All of the movable contacts within any one of the switches operate simultaneously. The three switches 56, 66 and 86 are mechanically interlocked so that when any one of them is manually placed in the operate position, any other switch in the operate position is automatically returned to the non-operate position.

Hence at all times only one of the three switches 56, 66 and 86 will be in the operate (down) position.

Each of the three switches 56, 66 and 86 serve different functions depending on whether they are located at the called or calling station, in operate or non-operate position. The stand-by switch 56 in the non-operate position at the calling station and in the operate position at the called station serves to complete a portion of both the signal and voice circuit.

However, if the calling station is attempting to contact a station which is engaged in conversation with a third station, the stand-by switch 56 at the calling station, in the non-operate position, will complete a portion of the busy signal circuit. The stand-by switch 56 must always be in the operate position at a station that is to be or has been called. Hence the operator at each station should always keep the stand-by switch in the operate position when he is not originating a call.

At the calling station, one station selector switch will be in the operate position and the other in the non-operate position. The station selector switch in the operate position serves to select and complete the connection for both the signalling and voice circuit to the desired station and also forms part of the busy circuit for any incoming calls.

There are many circuits which must be made or broken when calling a station. To minimize the number of contacts on each station selector switch, advantage is taken of the fact that the stand-by switch 56 will automatically return from the operate to the non-operate position when any station selector switch is moved to operate position. In this manner several of the switching functions which must be performed no matter which station selector switch is operated are transferred to the standby switch 56.

At the called station, both station selector switches are in the non-operate position and thus serve to close a portion of the signalling and voice circuit.

Station selector switches 66 and 86 are selectively operated to select a station to be called by the operator of the station. There are as many station selector switches as there are stations to be selected, each switch being individual to the station to be selected.

For example, in the present illustration at station A the station selector switch 66 is individual to station B and when it is operated will complete signalling and voice circuits to station B over wires **111*b*—112*b*** as briefly stated above.

The fourth switch 76 is the usual talk-listen switch which is operated to down position for transmitting communications and in its alternate up position for receiving communications, as will be described hereinafter.

In addition to this feature, the switch 76 also contains a shorting bar 143 for the stationary contacts 141 and 142. This arrangement operates the pulse circuit as will hereinafter be described.

(3) *Relays*

Each station, in addition to the four switches cited above, is provided with two relays 57 and 77. The signal relay 77 at the calling station is not energized and thus serves to maintain an open circuit in the signalling circuit of lamp 24 and chime 25, of this station. The energized voice relay 57 at the calling station will serve to complete a portion of the voice circuit. If the calling station attempts to contact a station engaged in conversation with a third station, its voice relay 57 will not be sufficiently energized to operate and thus will complete a circuit to the busy signal lamp 135 as will hereinafter be described in greater detail.

The relay 77 as the called station is energized through the signalling circuit. When its armature is attracted, it will complete a circuit from the signal lamp 24 and chime 25 to the direct current source 108 and also complete the voice circuit for this station.

These relays 57 and 77 contain the windings 79 and 78, respectively. When the windings are de-energized, the movable contacts are in the up position and move to the down position only when these windings are energized.

In a modified form of my invention, relays 77 and 57 may be combined in one relay which will serve the function of both relays. This is possible because, functionally, both relays are never needed at the same time and thus the switching of a stand-by switch 56 can through additional contacts, automatically transfer this relay from one circuit to the other as required.

(4) *Other parts*

In addition to the heretofore mentioned switches and relays, each station contains an amplifier 117 and speaker microphone 26. The speaker microphones 26 located at all the stations are transducers that can be used as either microphones or speakers depending upon how they are electrically connected to the remainder of the circuit as will be described.

Figure 1 illustrates a typical intercommunication amplifier 117 and talk-listen switch 76 combination which is shown only in block form and for the sake of simplicity one side of all lines, such as amplifier input and output and speaker microphone 26 are shown as connected to ground, although in practice such lines may be switches or such connections may be completed by direct wiring.

The speaker microphone 26 at the called station is connected to the winding 74—75 of transformer 70 due to contacts made at signal relay 77 and stand-by switch 56. At the calling station the microphone-speaker 26 is switched between the input terminal 35 and the output terminal 34 of the amplifier 117 depending on the position of the talk-listen switch 76. In a similar manner, the output and input terminals 34 and 35 of the amplifier 117 are switched to the winding 74—75 of transformer 70 depending on the position of the talk-listen switch 76.

B. SIGNALLING CIRCUIT

The circuits and their function can best be described by examining the operations which occur in originating a call, as for example, when station A originates a call to station B as is seen in Figure 4. If station B is not engaged in conversation and station A desires to communicate with station B, he will place the station selector switch 66 in the operate position. This action will move the stand-by switch 56 to the non-operate position and will also connect station A to station B by means of wires **111*b* and 112*b***.

This will permit energization of relay 57 at station A and relay 77 at station B over the complete circuit extending from one side of battery supply 108 (Fig. 4), conductor 18, terminal 87, conductor 101, terminal 19, winding 79, terminal 58, conductor 59, stationary contact 60 and movable contact 61 of stand-by switch 56 (this switch 56 was automatically moved to non-operate position when station selector switch 66 was moved to operate position), conductor 62, to mid-tap 72 of transformer 70 secondary winding 71—73.

At this mid-tap 72, the current divides to the extremities of the secondary winding to terminals 71 and 73 to flow through the two paths of: (1) terminal 71, conductor 67, movable contact 65 and stationary contact 10 of station selector switch 66 (this switch is in the operate position), conductor 174, terminal 89, conductor **111*b*, terminal 91, conductor 193, to station B, stationary contact 80 and movable contact 81 (station selector switches 66 and 86 at station B are in non-operate position), conductor 93, stationary contact 68 and movable contact 65 of station selector switch 66, conductor 67, terminal 71 to mid-tap 72 and (2) the other path followed by the current at mid-tap 72 at station A is to terminal 73, conductor 64, movable contact 63, stationary contact 12 of selector switch 66, conductor 195, terminal 90 and over conductor 112*b* to terminal 92, conductor 194, fixed contact 82, movable contact 188, conductor 94, stationary contact 69, and movable contact 63, conductor 64, terminal 73 to mid-tap 72**.

Thus, the current from these two circuits combines at mid-tap 72 in station B to flow over conductor 62, movable contact 61 and stationary contact 14 of stand-by switch 56 (this switch at station B is in the operate position), conductor 95, terminal 15, winding 78, terminal 16, conductor 96, terminal 83, conductor 97, terminal 98, conductor 17 to the other side of battery supply 108.

This circuit, outlined in numerals only, is as follows: 108, 18, 87 (station A), 101, 19, 79, 58, 59, 60, 61, 62, 72, divides to (1) 71, 67, 65, 10, 174, 89, **111*b*, 91 (station B), 193, 80, 81, 93, 68, 65, 67, 71, 72 (2) also (station A), 73, 64, 63, 12, 195, 90, 112*b*, 92 (station B), 194, 82, 188, 94, 69, 63, 64, 73, 72; 62, 61, 14, 95, 15, 78, 16, 96, 83, 97, 98, 17, 108**.

The completion of this circuit will (1) energize the relay 57 at the calling station A, (2) energize the relay 77 at the called station B, and (3) will connect the windings 71—73 of transformer 70 at station A to secondary winding 71—73 of transformer 70 at station B. As was heretofore mentioned, the closing of the relay 77 at station B will permit signalling units 24 and 25 at station B to be energized and will also complete the voice circuits at both stations as hereinafter more fully explained.

As may be observed in Figures 1 and 4, the winding 79 of relay 57 consists of two windings, a large resistance winding of 145 ohms and a low resistance winding of 15 ohms. The relay 57 is also so designed that with the resistance value shown and a small value of line resistance, it will be energized upon the completion of the circuit as outlined and its movable contact 21 will be moved to engage the stationary contact 20 and thus short circuit the 145 ohm winding. Relay 57 is designed so that after it has operated and contacts 20 and 21 have come into engagement, the increased current flow in the 15 ohm winding circuit resulting from the short circuiting of the 145 ohm winding will be adequate to keep the relay 57 in the closed position as long as the energizing circuit remains electrically complete.

By virtue of the short circuiting of the 145 ohm winding at relay 57 of station A (Fig. 4), the current flow in loop circuit described is now increased. In the circuit described, when the winding 78 and the 15 ohm and 145 ohm portion of winding 79 were in series, the resistance of the circuit was large enough to limit the current so that the magnitude of ampere turns at winding 78 was insufficient to attract the armature of relay 77. However, when the armature of relay 57 was attracted to permit the short circuiting at the 145 ohm winding, the increased current flow resulting therefrom was sufficient to attract the armature of relay 77 at station B.

This particular circuit permits the use of a relay of moderate sensitivity for relay 77. A higher sensitivity relay 77 would have operated immediately upon the closing of the circuit although this would give no practical advantage and would require a higher cost relay for relay 77.

When the armature of relay 77 at station B is thus attracted, the movable contact 23 will engage the stationary contact 22 and current will flow in the following circuit as is best seen in Figure 4; direct current power supply 108, conductor 17, terminal 98, conductor 97, terminal 83, conductor 115, stationary contact 22 and movable contact 23 of energized relay 77, signal lamp 24, chime solenoid 25, terminal 85, conductor 116, terminal 99, conductor 18, back to minus terminal of the direct current power supply 108. This circuit as outlined in numerals is as follows: 108+, 17, 98, 97, 83 115, 22, 23, 24, 25, 85, 116, 99, 18, 108—. The signal lamp 24 and chime solenoid 25 are connected in series and thus completion of the above-described circuit will cause the chime to sound and the signal lamp 25 to illuminate at station B.

This provides an indication at station B that some station in the system, in this case station A, has originated a call. As will hereinafter be more fully described, the two stations A and B are now prepared for voice intercommunication. The use of both a visual (lamp 24) and audible (chime) means has alerted the operator of called station B that (1) he is being called by another station on the network; (2) that some other station on the network can hear the conversation which takes place in the vicinity of station B.

Hence, I have provided a circuit arrangement whereby the act performed by the calling party for completing the two-way communication circuit also automatically and simultaneously operates signalling devices at the called station to immediately apprise the called party that his communication line has been completed and that conversation in his office is, therefore, being carried over the system to another station.

C. VOICE CIRCUIT

As hereinbefore described, station A has notified station B by means of light 24 and chime 25 that it wishes to originate a call to station B. This was accomplished by energizing the winding 78 of relay 77 at station B. As was heretofore mentioned, the energized relay 77 at the called station serves to complete both the signal and voice circuit as may best be seen in Figure 5.

The voice electrical circuit from the speaker-microphone 26 at station B to the winding 74—75 of the transformer 70 is completed as follows as is best seen in Fig. 5: From terminal 119 on speaker-microphone 26, to conductor 120, terminal 121, conductor 123, contacts 45 to 44 (relay 77 energized at station B), conductor 124, through privacy switch 43 (normally closed), conductor 125, stationary contact 42 and movable contact 39 (stand-by switch 56 at station B is in operate position), conductor 126 to terminal 74, through winding 74—75 of transformer 70 to terminal 75, through ground to terminal 118 on other side of speaker-microphone 26. This circuit, as outlined in numerals only, is as follows: 26, 119, 120, 121, 123, 45, 44, 124, 43, 125, 42, 39, 126, 74, 75, ground 118, 26. Thus, the speaker-microphone 26 at station B is connected to the winding 74—75 of the transformer 70.

As was previously noted in connection with the signalling circuit the windings 7—72—73 of the transformer 70 at stations A and B are electrically connected (Figures 4 and 5). It will be apparent that if the speaker-microphone 26 at station A (Figure 5) is connected to the output 34 of the amplifier 117, and the input 35 of the amplifier 117 is connected to the winding 75—74 of station A that the voice currents originating at microphone 26 of station B will be heard at station A speaker-microphone 26.

Also, it will be apparent that if at station A microphone 26 is connected to the input 35 of amplifier 117 and the output 34 of the amplifier 117 is connected to the winding 74—75, then voice currents emanating from microphone 26 at station A will be heard on speaker 26 at station B. The talk-listen switch 76 at station A is provided to permit the switching operation necessary to achieve these two circuits.

If station A wishes to listen, the talk-listen switch 76 is put in the listen position (up). This completes the following circuit:

At station A (Figure 5) from the terminal 119 of speaker 26 to conductor 120, terminal 121, conductor 122, movable contact 27 and stationary contact 28 of relay 57 (relay 57 at station A is energized), conductor 127, movable contact 29 and stationary contact 30 of switch 56 (stand-by switch 56 at station A is in non-operate position), conductor 128 to stationary contact 32 and movable contact 33 of switch 76 (talk-listen switch 76 is in the up or listen position), conductor 129 to the output terminal 34 of amplifier 117. The input terminal 35 of the amplifier 117 is connected by conductor 130 to movable contact 37 and stationary contact 36, terminal 175, conductor 131, stationary contact 38 and movable contact 39, conductor 126 to terminal 74, of transformer 70, the above circuits are both completed through ground. This circuit, outlined in numerals only, is as follows: 26, 119, 120, 121, 122, 27, 28, 127, 29, 30, 128, 32, 33, 129, 34, and 117. The other circuit extends from 117, 35, 130, 37, 36, 175, 131, 38, 39, 126, 74, 75.

Thus, as heretofore mentioned with this circuit connection achieved by putting station A talk-listen switch 76 in listen position, the speaker 26 at station A can listen to voice originating at station B.

If the station A wishes to talk to station B, the same switch 76 at station A is placed in the down or talk position indicated by the dashed lines of Figure 5. This will connect the microphone 26 at station A to the amplifier 117 input terminal 35 and connect the output terminal 34 to the transformer 70, winding 74—75 and the resulting electrical circuit is as follows:

From terminal 119 of microphone 26, through conductor 120, terminal 121, conductor 122, contacts 27 and 28 (relay 57 at station A is energized), conductor 127, contacts 29 and 30 (stand-by switch 56 is in non-operate position at station A), conductor 128 to contacts 31 and 37 (talk-listen switch 76 in talk position at station A), conductor 130 to input terminal 35 of amplifier 117 and over ground to terminal 118 of microphone 26. The output terminal 34 is connected by conductor 129 to contacts 33 and 41, terminal 175 through conductor 131 to contacts 38 and 39, conductor 126 to terminal 74, winding 74—75 of transformer 70 to terminal 75 completed through ground to output of amplifier 117. These circuits, outlined in numerals only, are as follows: 26, 119, 120, 121, 122, 27, 28, 127, 29, 30, 128, 31, 37, 130, 35, ground 118 and 34, 129, 33, 41, 175, 131, 38, 39, 126, 74, ground 75, respectively. Thus, the circuit is complete so that station A can talk and be heard by station B (Figure 5).

It will be observed that only one station has to operate the talk-listen switch 76 and that station is always the one originating the call as in the illustrated case, station A. It is clear that the voice circuits and signalling circuits have been combined to operate over the same wiring pairs for reasons of economy and design only and the basic invention could be modified to permit the use of separate lines for voice communication and signalling circuits without changing its essential character.

It will also be observed that unless one of the relays on the station is closed, the reproducer microphone 26 at that station will be connected solely to open relay contacts and as a result, no sound will emanate from the intercommunication unit except during these intervals when communication circuits have been temporarily established by the operation of a switch, such as switches 56, 66 and 86.

This silence is a desirable feature since in the commercial design there is a small residual hum and noise which emanates from the amplifier 117 during stand-by periods which might prove objectionable in a quiet office if the loud speaker 26 were connected to the output 34 of the amplifier 117 at all times.

D. PRIVACY SWITCH

Had the privacy switch 43 at station B been left in the open or private position, the heretofore mentioned operation and function of the signal circuits would not have interrupted. However, the voice circuits, as seen in Figure 5, would have been interrupted by privacy switch 43 so that this switch can serve as an absolute guarantee of freedom from interruption by voice or eavesdropping in those exceptional cases where the degree of privacy furnished by the operation of the chime 25 and lamp 24 is not regarded as adequate.

This privacy switch 43 is not an essential feature of the system outlined.

E. BUSY SIGNAL

The direct current supply 108 permits six volts to exist between lines 17 and 18. When station A originally called station B and before the relay 57 at station A closed, the resistances in the path of line 17 to 18 consisted substantially of 47 ohm winding 78 in the signal relay 77 at station B and 160 ohm (15 plus 145) winding 79 of relay 57 at station A as is best seen in Figure 4 (neglecting line resistances and the resistance of the transformer 70 winding at both stations since both resistances are assumed to be negligible in comparison with the relay resistances).

Under these circumstances, neglecting transient effects due to the inductance of the relay windings, the voltage drop across the 47 ohm winding 78 would be approximately 1.4 volts and the voltage drop across the winding 79, 4.6 volts. After relay 57 has closed, the resistances in the circuit consist only of the 47 ohm winding 78 of the signal relay 77 at station B and the 15 ohm winding of relay 57 at station A. The voltage drop would then be approximately 4.5 volts across the 47 ohm winding 78 of relay 77 and 1.5 volts across the 15 ohm winding 78 of relay 57.

The relay 77 will operate at a voltage somewhat below 4.5 volts. Relay 57 with both parts of winding 79 in use will operate at a voltage in the vicinity of 4 volts and will hold closed with any voltage above approximately 1 volt across the 15 ohm winding. These are approximate design criteria and the values would, of course, change depending upon the selected voltage of power supply 108, allowances being made in a specific case for line voltage drops, transformer winding drops, etc., and also for the commercial tolerances in the parts and thus the values are recited only for illustrative purposes.

If station C attempted to call station B (Figure 6), the circuit arrangements would be very much the same as those outlined for station A calling station B. However, the voltage available at the transformer point 72 in station C would now be only 1.5 volts, as outlined above, because of the fact that station A has already established contact with station B and thus a 4.5 volt drop already exists across relay 77 at station B.

Actually the voltage would be somewhat less than 1.5 volts because of the added current drain of relay 57 in station C but not substantially less. Relay 57 is designed to operate somewhere around 4 volts and, therefore, will not operate.

A busy signal will then appear at station C. The busy signal at station C (Figure 6) receives its voltage as follows: From direct current voltage supply 108+ through line 17 to terminal 133 and conductor 134 to contacts 51 and 52 (stand-by switch 56 at station C in non-operate position), conductor 132 to terminal 50, through busy signal lamp 135 to terminal 53, conductor 136 to contacts 54 and 21 (relay 57 at station C is not sufficiently energized to effect contact movement), conductor 137 to terminal 19, conductor 138 to terminal 139, conductor 18 to direct current supply 108—.

Referring to Figure 6, it will be obvious that the busy signal lamp 135 at station C will illuminate primarily because relay 57 has not been sufficiently energized to close. Similarly, the voice circuits at station C will be interrupted at contacts 27 and 28 of relay 57 because that relay has not closed. It is thus obvious that if station C attempted to call station B after station A had already established communication with station B, station C would receive a busy signal and also have its voice circuits so interrupted that it could not overhear the conversation already in progress.

Any other desirable type of device could be used as a busy signal in place of the lamp illustrated, for example, a buzzer.

In the signalling circuits previously described, it will be noted that the energization of relay 57 at the calling station A depended upon the fact that the stand-by switch 57 at its station was in the non-operative postion and at least one of the station selector switches was in the operate position.

Hence, when station C desires to call station A, the fact that one of the station selector switches (in this case switch 66) is in the operate position will prevent an energizing circuit from being completed for relay 57 of station C. The voltage for relay 57 at station C would normally come from point 72 of transformer 70 at station A (Figure 7) through contacts 65—68 and 63—69 of station selector switch 66, contacts 81—80 and 138—82 of station selector switch 86, through station A signal and voice lines **113*a* and 114*a*** to station C.

However, this circuit is interrupted at contacts 65—68 and 63—69 because station selector switch 66 at station A will be in the operate position to contact station B and accordingly no current will flow from point 72 of transformer 70 at station A to conductors **113*a* and 114*a*. For this reason, relay 57** will not operate at station C.

Inasmuch as relay 57 at station C is kept de-energized when its operator attempts to call station A, as in the above example: (1) a busy signal circuit will be completed for the lamp 135 as outlined above to apprise the operator at station C of the fact that station A is busy, and (2) the voice circuit will be interrupted as previously noted.

All values referred to are for purposes of illustration only and could be modified at will to meet design requirements in specific cases.

They are illustrative of the actual values which would constitute good design for a system using #22 twisted pair cable of standard telephone type for inter-station wiring on systems where the total length of wiring involved did not greatly exceed 1000 feet and where the voltage source 108 used for relay and lamp operation was 6 volts direct current using #18 wire for lines 17 and 18, and the resistances assigned to the relay coils would permit the easy manufacture and adjustment of relays to operate at the voltages referred to in the text.

It is obvious that these voltages, lines resistances, etc., could be modified to operate properly over much longer lines if required. The three basic design criteria are that of the two windings on relay 57, one having a considerably higher resistance than the other, this winding being shorted out after relay 57 closes and the relationship of the resistances of these windings to the resistance of the winding of relay 77. This permits the voltage drop across the signal relay 77 in the called station to be small enough not to effect the closing of the relay 57 when the both coils are in series and large enough to prevent the closing of a like relay 57 in another station after communication circuits have been established by the shorting out of the high resistance winding in the relay 57 in the calling station.

It is also clear that the points at which the voice circuit have been interrupted in cases where a busy signal arises have been arbitrarily chosen for convenience and the circuits could be interrupted in any number of other ways or at other points without changing the basic character of the invention.

It is also clear that the power supply 108 can not only be of any desired voltage but may also be an alternating current as well as a direct current supply. The signalling circuit voltage does not have to be the same voltage used to operate the audible and visual signalling device. Those circuits are controlled by relay 77 contacts which could be connected to any other convenient source of voltage.

The chime circuit is operated through a solenoid 25 which requires a heavy flow of current for a short period of time to move the plunger, the greatest amount of energy being expended in overcoming friction at the plunger.

After the plunger is brought into movement, the intensity of current determines how hard the plunger will strike the chime. If the chime current is left on, only a single chime note will be struck and thereafter the solenoid coil 25 will simply act as a drain on the power supply.

In the present case, I want to operate a lamp simultaneously with the chime. A typical metallic filament lamp has approximately 10 times the resistance at normal operating temperatures than it has when cold. I connect, in series, a lamp 24, chime solenoid 25, direct current power source 108 and contacts 22—23 of relay 77. When the contacts 22—23 engage, a complete electrical circuit is available to allow current to flow through the lamp 24 and chime solenoid 25, as was heretofore described.

In a plot of lamp resistance against time, the lamp resistance changes from approximately 4 ohms cold to approximately 40 ohms hot in a fraction of a second while the lamp filament is heating up to normal operating brilliance.

Thus, at the initial instant-neglecting the effect of the inductance in the solenoid coil 25 but regarding it merely as a resistance of 22 ohms—it is obvious that the loop resistance will be 26 ohms and most of the power will be developed across the coil. In the steady state condition when the lamp resistance is 40 ohms, the total current in the loop circuit will be reduced, less power will will be expended in the entire circuit, and the bulk of what power is expended will appear across the lamp 24 and not across the coil 25.

In a practical solenoid operated chime device of the type used, most of the power is required in the initial instant to set the plunger in motion and overcome static friction. In a small fraction of a second, the plunger has acquired sufficient momentum to continue its travel unchecked until it strikes the resonator bar even if the current were entirely removed.

Hence, when this circuit is first closed, most of the voltage drop is across the chime solenoid 25 since the lamp 24 resistance is low.

Shortly after the plunger of solenoid 25 has acquired sufficient momentum to strike the chime, the lamp 24 has heated up to its normal running resistance, and most of the available voltage drop and power dissipation occurs in the lamp 24 and only a small additional amount of power from the power source 108 is required to account for the heat losses of solenoid 25; most of the useful power being absorbed in lamp 24.

The utilization of a chime or a continuously operated lamp will warn the person near a station being called that he is being called and also in a position to be eavesdropped upon. That is, the chime will sound once and the lamp 24 will illuminate and remain illuminated until the completion of the call.

It is clear that the type of signalling device used for the signal could be modified in any of the conventional ways well-known to those versed in the art to provide a different type of audible and/or visual signal, the essential element being in the arrangement of the actuation of this signal wherein current drawn for the operation of a relay 57 at the calling station flows through a relay 77 at the called station causing this latter relay 77 to operate and this latter relay then operates the signal.

F. PULSE CIRCUIT

Figure 3:
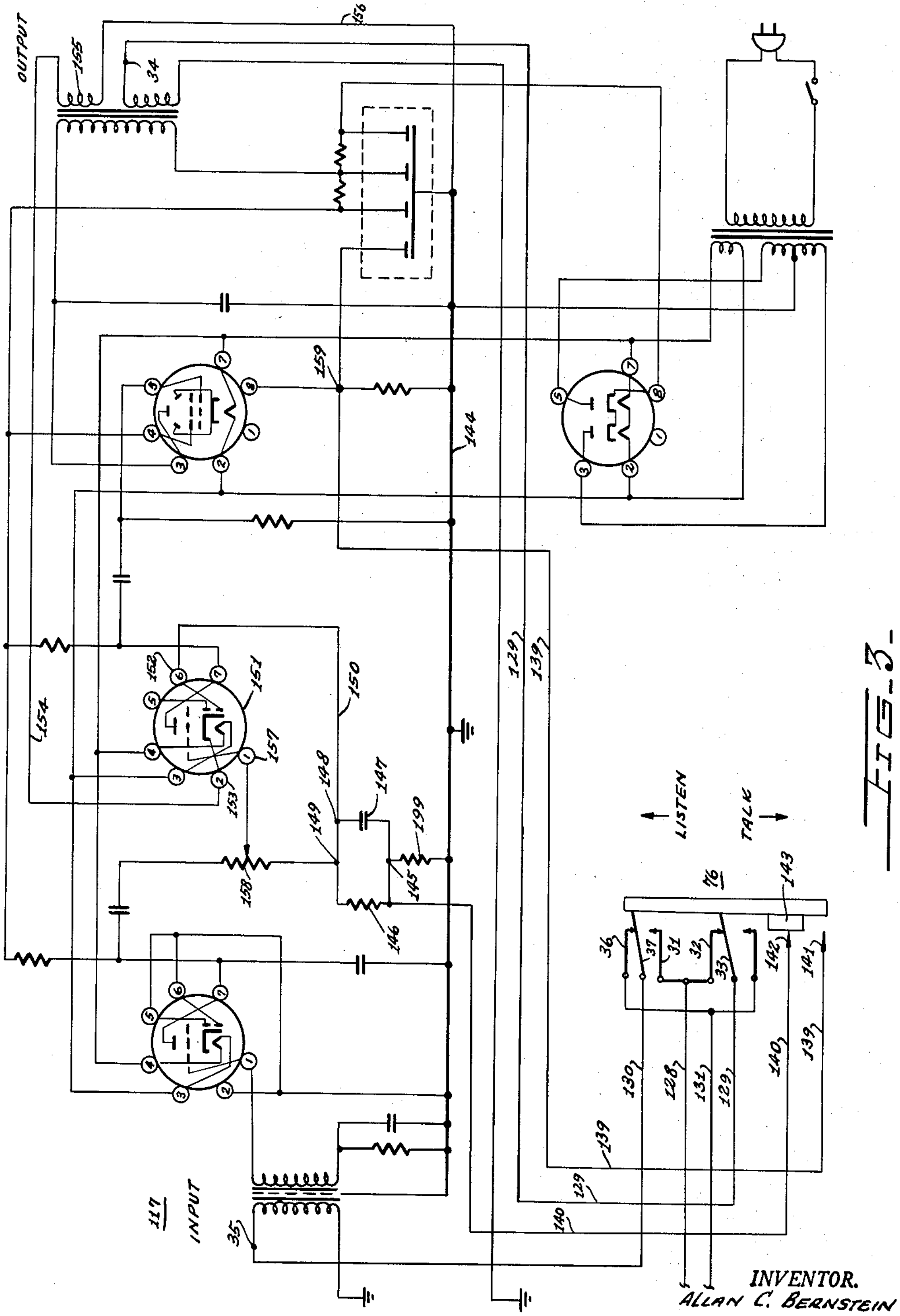
Figure 3 is a circuit diagram of the amplifier and more particularly of the pulse circuit of my invention.

The amplifier 117 connected in Fig. 1 and illustrated in detail in Figure 3 is of negative feed-back design and generally forms no part of my present invention, except for the pulse circuit which will now be described.

On the intercommunication system voice circuit herein described, there is a speaker-microphone 26 at station B (Figure 5) and a speaker-microphone 26, an amplifier 117 and a talk-listen switching means 76 for reversing the direction of the transmission at station A when this station A originates the call.

To accomplish reversal from talk to listen position by operating the switch 76, the end that was formerly a loud speaker now becomes a microphone and in becoming a microphone reverberations either of the diaphragm of the loud speaker or of the housing of the loud speaker or in the room proper in which the loud speaker was located are still present when it becomes a microphone. These sounds are attenuated but they have not died away completely and some portion of these reverberations may come through to the other end depending on the speed with which switch 76 is operated, appearing as a sort of dull boom commonly referred to as a key click.

I propose to eliminate this effect by blanking out the amplifier 117 for a portion of the switching cycle and also for an additional period long enough to enable the reverberations to die away, at least sufficiently so that they will not be objectionable if they do come through at all.

Thus, the basic purpose of the pulse circuit is to blank out the amplifier 117 during a part of the switch cycle and for a sufficient additional length of time to enable the reverberations to die away at the end of the circuit which was formerly a loud speaker and which becomes a microphone after switching.

As may be seen in Figures 1 and 3, the talk-listen switch 76 is provided with two contacts 141 and 142 and a shorting bar 143 for these contacts.

As may best be seen in Figure 3, the talk-listen switch 76 is in the listen position and the slide shorting bar 143 is in electrical engagement with only one contact 142. Shorting bar 143 moves when the switch 76 is moved and the contacts 141 and 142 and bar 143 are so arranged that the moving bar 143 will only short circuit the two fixed contacts 141 and 142 during the middle portion of the switching cycle. Thus, the contacts 141 and 142 will be open at both the start and end of the switching cycle.

At point 159 there is a positive voltage of approximately 14 volts in relation to the B minus points on conductor 144. During a portion of the switching cycle when the shorting bar 143 short circuits the two contacts 141 and 142, an electrical circuit will be completed as follows:

From positive potential point 159, conductor 139, contact 141, shorting bar 143, contact 142, conductor 140 to terminal 145, through the parallel path of resistor 146 and condenser 147 to terminal 148, conductor 150 to the diode plate 152 of tube 151, through the tube to cathode 153, conductor 154, coil 155, conductor 156 to the B minus conductor 144. This circuit outlined in numerals is as follows: 159, 139, 141, 143, 142, 140, 145, 147 (and 146), 148, 150, 151, 152, 153, 154, 155, 156, 144). Thus, through this circuit, the condenser 147 will become charged with the direction of current flow being as outlined; the plus side of the condenser 147 is at the terminal 145 and the minus side of the terminal 148.

The resistor 199 from point 145 to ground must be high enough relative to the internal resistance of the potential source at point 159 to avoid substantially lowering this potential source during that time when the charging circuit is in operation. This potential source 159 is the cathode bias resistor from the output tube. An additional source of energy for the pulse circuit is the charge built up across the relatively high capacity condenser which is normally connected from point 159 to B—.

The duration of closing of contacts 141—142 must be sufficient to allow the charging of condenser 147 to 14 volts or at least to a sufficient voltage to allow tube 151 to cut off.

When the switching operation is almost complete, the circuit between contacts 141 and 142 is broken. Immediately terminal 145 must assume the potential of the B minus conductor 144. The current flow has been interrupted by the open circuit at terminals 141 and 142 and, therefore, there is no longer a source of positive potential to continue to charge condenser 147. The diode plate 152 will now be negative by approximately 14 volts with respect to B minus conductor 144 due to the charge on condenser 147. Since the cathode 153 is at approximately the B minus potential of conductor 144, no current will flow through the tube 151 from diode plate 152 to cathode 153.

Furthermore, terminal 149, volume control 158 and grid 157 will also be 14 volts negative with respect to B minus conductor 144. Thus, a 14 volt negative potential on the grid 157 of tube 151 will be more than sufficient to cut off tube 151, which tube has been selected for sharp cut off. This cutting off of the tube 151 causes the blanking out of the amplifier for the duration of the switching period and for an additional period.

The duration of time that tube 151 is cut off will depend upon the charge placed upon condenser 147, the discharge time constant of condenser 147 through resistor 146 and the negative voltage on grid 157 of tube 151 which will permit tube 151 to conduct, commonly referred to as the cut off voltage of tube 151.

The condenser 147 will commence to discharge when the break at contacts 141 and 142 occurs. The condenser 147 will discharge through resistor 146 with a time constant determined by the capacitance of condenser 147 and resistance of resistor 146. The value of this time constant will determine the period that the amplifier is blanked out. When the condenser 147 is sufficiently discharged, the grid 157 will return substantially to the B minus potential of conductor 144 and the amplifier 117 will function again in the normal manner.

The condenser 147 and resistor 146 also constitute what is commonly known as a zero bias circuit to permit the normal operation of tube 151 with moderate or low distortion when signals are introduced on its grid without any other source of grid voltage bias.

The key click and the blanking out described above occurs when switch 76 is moved from the talk position to the listen position. The blanking out is achieved in the manner described above for movement of the switch in either direction.

I have shown and described a specific embodiment of my invention. However, various changes may be made in the form of the invention herein shown and described without departing from the spirit of the invention in the scope of the following claims.

I claim:

1. In an intercommunicating system comprising a plurality of stations, communications circuits interconnecting said stations, a transducer individual to each station and a signalling means comprising a series connected visual and single stroke audible chime signalling device at each of said stations, means at each of said stations for completing said communicating circuit from the transducer thereat to the transducer at a selected one other of said stations, and means including circuit connections controlled by completion of said communication circuit for automatically operating said signalling device at the selected station to which the communications circuits have been completed.

2. In an intercommunicating system comprising a plurality of stations, communications circuits interconnecting said stations, a transducer individual to each station and a signalling means comprising a series connected visual and single operation audible chime signalling device connected in series at each of said stations, means at each of said stations for completing said communicating circuit from the transducer thereat to the transducer at the selected one other of said stations, and means including circuit connections controlled by completion of said communication circuit for automatically operating said signalling device at the selected station to which the communications circuit has been completed.

3. In an intercommunication system, a plurality of stations, a common power supply for all of said stations, a communication circuit individual to each of said stations extending between said stations; each of said stations having communication equipment including a transducer, a visual signalling device and an audible signalling device, said signalling devices being connected in series; an amplifier, a busy signal lamp, and a plurality of station selector switches individual to each of the stations to be selected for communication therewith, means including circuit connections controlled by the operation of one of said station selector switches individual to a station for completing a communication circuit between the calling station at which said station selector switch is located and the called station individual to said station selector switch, said means including said signalling devices, and a talk-listen switch at the calling station for switching said transducer at the called station from acting as a transmitting transducer to a receiving transducer and vice versa.

4. In an intercommunication system, a plurality of stations, a common power supply for all of said stations, a communication circuit individual to each of said stations extending between said stations; each of said stations having communication equipment including a transducer, a visual signalling device and an audible signalling device connected in series; an amplifier, a busy signal lamp, a stand-by switch, and a plurality of station selector switches individual to each of the stations to be selected for communication therewith, each of said switches having an operate and non-operate position, means for mechanically interlocking said stand-by and station selector switches so that when any one of them is moved to its operate position the other switches are automatically moved to their non-operate position, said stand-by switch in its operate position preparing the communication equipment circuits thereat for receiving an incoming call and in its non-operate position preparing a circuit for making a station selection, each of said station selector switches when operated to their operate position serving to select and complete communication circuit connections for both the signalling and voice circuits to the station individual to said selector switch and also presenting an open circuit to incoming calls, said station selector switches in their non-operate position serving to close a portion of the signalling circuits, a talk-listen switch having a talk position in which the transducer circuit is connected for transmitting communication and having a listen position in which the transducer at said station is connected for receiving signals from a remote station, said talk-listen switch also having a shorting bar for blanking out said amplifier momentarily during the moving operation of said talk-listen switch, each of said stations in addition to the said switches having a signalling device control relay and a voice circuit control relay, said signalling device control relay when de-energized maintaining the circuit to said voice circuit open and when energized controlling the energizing circuit of said signalling device and also completing a circuit for said transducer, said voice circuit control relay serving to control a portion of a voice circuit between the calling and called station and also preparing an energizing circuit for said busy signal lamp, means including circuit connections completed by the operation of a station selector switch to its operate position for completing over its contacts and the contacts of the stand-by switch now automatically operated to its non-operate position energizing circuit connections for said voice circuit control relay at its station and for the said signal device control relay at the selected station, means including circuit connections controlled by the energization of said voice relay at the calling station for completing an energizing circuit for the transducer at the calling station over said stand-by switch in its non-operate position to the talk-listen switch, said talk-listen switch in one position extending the said circuit for said transducer to the output of said amplifier for operating said transducer as a listening device, and said talk-listen switch when operated to its alternate or talk position connecting said transducer to said amplifier input for operating said transducer as a talking device, said talk-listen switch in its first position connecting the input of said amplifier to said communication circuit and in its alternate position connecting the output of said amplifier to said communication circuit, means including circuit connections for operating said busy signal lamp at any station attempting to call a station already in communication.

5. In an intercommunication system, a plurality of stations, a source of signal current, a source of voice current, a communications circuit individual to each of said stations extending between said stations; each of said stations having communication equipment including a transducer normally connected to transmit, a talk-listen switch for controlling the source of voice current and the direction of communication between two connected stations, a stand-by switch for controlling said source of signal current, said stand-by switch having an operate and non-operate position, and circuit connections for rendering said talk-listen switch operative when said stand-by switch is in the non-operate position, said talk-listen switch at the calling station when operated switching said transducer at the called station from transmission to receiving use and vice versa.

6. In an intercommunication system, a plurality of stations, a communications circuit individual to each of said stations extending between said stations, each of said stations having communications equipment including a transducer normally connected to transmit, a talk-listen switch, and means including circuit connections controlled at the called station for rendering said talk-listen switch individual to its own station ineffective and for rendering said transducer individual to its own station under the control of said talk-listen switch at the calling station.

7. In an intercommunication system, a plurality of stations, a communications circuit individual to each of said stations extending between said stations, each of said stations having communications equipment including a relay, a transducer normally connected to transmit, a stand-by switch and a plurality of station selector switches individual to each of the stations to be selected for communication therewith, each of said switches having an operate and non-operate position, a talk-listen switch, means including circuit connections controlled by each station selector switch when placed in the operate position for preparing a portion of the circuit which places the said transducer under control of the said talk-listen switch and also partially completing the energizing circuit for said relay, and said relay when energized completing the circuit which places the said transducer under control of said talk-listen switch.

8. In an intercommunication system, a plurality of stations, a communication circuit individual to each of said stations extending between said stations, each of said stations having communications equipment including an amplifier, a relay, signalling device, a transducer normally connected to transmit, a stand-by switch and a plurality of station selector switches individual to each of the other stations to be selected for communications therewith, each of said switches having an operate and non-operate position, a talk-listen switch, said station selector switches in the non-operate position at the called station completing an energizing circuit for said relay and also partially completing a circuit to connect said transducer directly to the communications circuit by-passing the said amplifier and talk-listen switch individual to its station, said relay serving when energized to actuate said signalling device, said signalling device comprising a single stroke audible chime.

9. In an intercommunication system, a plurality of stations, a communication circuit individual to each of said stations extending between said stations, each of said stations having communications equipment including an amplifier, a relay, signalling device, a transducer normally connected to transmit, a stand-by switch and a plurality of station selector switches individual to each of the other stations to be selected for communications therewith, each of said switches having an operate and non-operate position, a talk-listen switch, and said station selector switches in the non-operate position at the called station partially completing a circuit to connect the said transducer individual to its station directly to the communications circuit, said relay serving when energized to actuate said signalling device, said signalling device comprising a single stroke audible chime.

10. In an intercommunication system, a plurality of stations, a common power supply at each of said stations, a communication circuit individual to each of said stations extending between said stations: each of said stations having communication equipment including a transducer, a visual signalling device and an audible signalling device connected in series; an amplifier, a busy signal lamp, and a plurality of station selector switches individual to each of the stations to be selected for communication therewith, means including circuit connections controlled by the operation of one of said station selector switches individual to a station for completing a communication circuit between the calling station at which said station selector switch is located and the called station individual to said station selector switch, said means including said signalling devices, a talk-listen switch at the calling station for switching said transducer at the called station from acting as a transmitting transducer to a receiving transducer and vice-versa, and means including circuit connections operative in response to the completion of said communication circuit for rendering said talk-listen switch at the called station ineffective to control said transducers.

11. In an intercommunicating system comprising a plurality of stations, communications circuits interconnecting said stations, a transducer individual to each station and a signalling device comprising a single stroke audible chime at each of said stations, a first means at each of said stations for completing said communicating circuit to a selected one other of said stations, second means energized by completion of said communication circuit for automatically operating said signalling device at the selected station to which the communications circuits have been completed, and third means manually controlled at the calling station which initiated the communication circuit to the called station for switching the direction of communication from the calling to the called station and from the called to the calling station.

12. In an intercommunicating system comprising a plurality of stations, communications circuits interconnecting said stations, a transducer individual to each station and a signalling device comprising a single stroke audible chime at each of said stations, a first means at each of said stations for completing said communicating circuit to a selected one other of said stations, second means energized by completion of said communication circuit for automatically operating said signalling device at the selected station to which the communications circuits have been completed, an amplifier at each station, third means manually controlled at the calling station which initiated the communication circuit to the called station for switching the transducer at the calling station from the input to the output of the amplifier thereat and for switching the transducer at the called station from the output to the input of the amplifier thereat.

13. In an intercommunicating system comprising a plurality of stations, communications circuits interconnecting said stations, a transducer individual to each station and a signalling device at each of said stations, a first means at each of said stations for completing said communicating circuit to a selected one other of said stations, second means energized by completion of said communication circuit for automatically operating said signalling device at the selected station to which the communications circuits have been completed, an amplifier at each station, third means manually controlled at the calling station which initiated the communication circuit to the call station for switching the transducer at the calling station from the input to the output of the amplifier thereat and for switching the transducer at the called station from the output to the input of the amplifier thereat and means for blanking out said amplifiers during said switching.

14. In an intercommunication system comprising a plurality of stations, a communication circuit interconnecting said stations, a transducer individual to each of said stations connected in said communication circuit, a signalling device for at least one of said stations, means at another of said stations for completing said communication circuit to said one of said stations and including the transducer thereat, and means including the circuit connections controlled by the completion of said communication circuit for automatically operating said signalling device at said one of said stations to indicate that the communication circuit thereto has been completed.

15. In an intercommunication system comprising a plurality of stations, a communication circuit interconnecting said stations, a transducer individual to each of said stations connected in said communication circuit, a signalling means comprising a visual and audible signalling device for at least one of said stations, means at another of said stations for completing said communication circuit to said one of said stations and including the transducer thereat, and means including the circuit connections controlled by the completion of said communication circuit for automatically operating said signalling devices at said one of said stations to indicate that the communication circuit thereto has been completed.

References Cited in the file of this patent

UNITED STATES PATENTS

| | | |
|---|---|---|
| 229,862 | Carter | July 13, 1880 |
| 1,181,665 | Hirsch | May 2, 1916 |
| 2,269,141 | Campbell | Jan. 6, 1942 |
| 2,269,142 | Campbell | Jan. 6, 1942 |
| 2,269,143 | Campbell | Jan. 6, 1942 |
| 2,347,079 | Campbell | Apr. 18, 1944 |
| 2,385,515 | Herrick | Sept. 25, 1945 |
| 2,491,954 | Conhagen | Dec. 20, 1949 |
| 2,512,834 | Legerth | June 27, 1950 |
| 2,529,912 | Campbell | Nov. 14, 1950 |
| 2,536,820 | Prahm | Jan. 2, 1951 |
| 2,554,912 | Kilminster | May 29, 1951 |